UNITED STATES PATENT OFFICE.

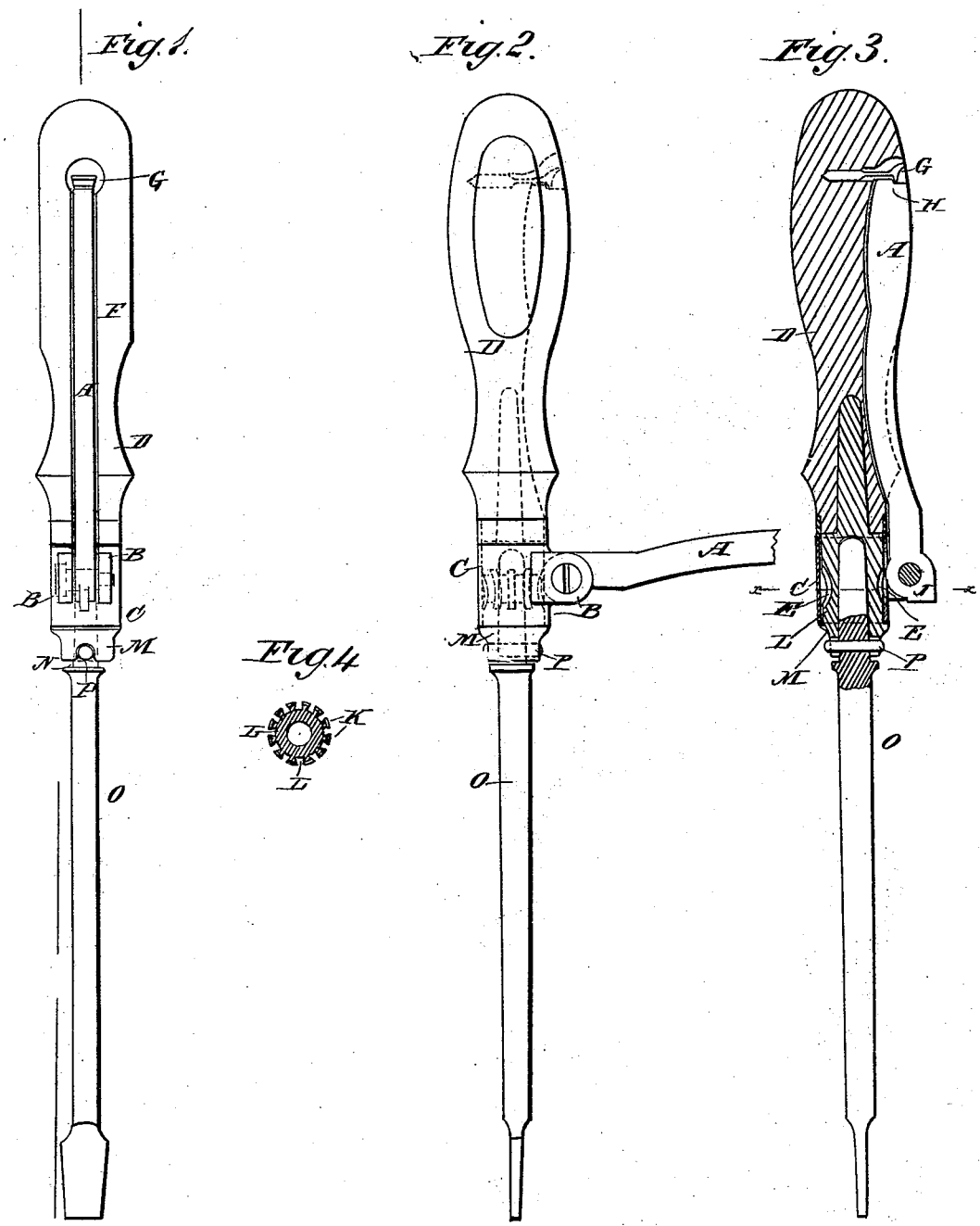

LEVERETT E. RHODES, OF HARTFORD, CONNECTICUT.

RATCHET SCREW-DRIVER.

SPECIFICATION forming part of Letters Patent No. 244,309, dated July 12, 1881.

Application filed May 21, 1881. (No model.)

*To all whom it may concern:*

Be it known that I, LEVERETT E. RHODES, of Hartford, in the county of Hartford and State of Connecticut, have invented an Improved Ratchet Screw-Driver, of which the following is a specification.

The object of my invention is to facilitate fastening large screws which present considerable resistance.

The invention consists in a screw-driver handle having an arm or lever pivoted to a sleeve loosely mounted on the handle and surrounding a ratchet-ring rigidly attached to the handle, this lever fitting in a longitudinal groove in the handle with a spring-catch when not in use; but when it is to be used it is drawn outward, and a tooth at its upper end passes through a slot in the sleeve in between two teeth of the ratchet-ring, and can thus be used as a powerful lever to turn the screw-driver. The handle is provided at its upper end with a notched socket to receive a removable screw-driver provided with a short transverse arm fitting in these notches.

In the accompanying drawings, Figure 1 is a longitudinal elevation of my improved ratchet screw-driver, showing the lever in its groove in the handle. Fig. 2 is a longitudinal elevation of the same, showing the lever drawn out of its groove. Fig. 3 is a longitudinal sectional elevation of the handle and longitudinal elevation of the screw-driver. Fig. 4 is a cross-sectional elevation of the ratchet on the line *x x*, Fig. 3.

Similar letters of reference indicate corresponding parts.

A lever, A, is pivoted to the jaws B of a sleeve, C, loosely mounted on the upper end of a screw-driver handle, D, this sleeve being provided with a longitudinal slot, E, between the jaws B. This lever fits in a longitudinal groove, F, of the handle D, which groove is provided at its lower end with a spring-catch, G, which catches on a shoulder, H, at the lower end of the lever A, and thus holds the lever in the groove F. The upper end of the lever A is provided with a tooth, J, fitting through the slot E in between two teeth, K, of a ratchet-ring, L, rigidly attached to the handle D below the sleeve C. The handle D is provided at its upper end with a socket, M, with two notches, N, for receiving the end of a detachable screw-driver, O, provided with a short transverse bar, P, fitting in the notches N.

The operation is as follows: The screw-driver is used in the ordinary manner until the resistance is too great, when the lever A is drawn outward, the tooth J passes in between two teeth, K, and the lever A is used to turn the screw-driver. The lever A is turned down to disengage the tooth J from the teeth, and the lever is turned back, is then again raised or drawn outward to catch in the teeth, and is again used to turn the screw-driver, &c. The lever A can only be used to turn the screw-driver when it is drawn outward, and the tooth J engages with the teeth K of the ratchet-ring L. The lever must be folded down a short distance before turning the sleeve (and the lever) in the inverse direction, so that the tooth J will not engage with the teeth K during this inverse movement. Any size or form of screw-driver may be placed in the ratchet M.

Having thus fully described my invention, I claim as new and desire to secure by Letters Patent—

In a screw-driver, the combination of the lever A, having shoulder H and tooth J, the longitudinally-slotted loose sleeve C, having the jaws B, the handle D, carrying the spring-catch G in a longitudinal groove, and the toothed ratchet-ring L, rigidly attached to the handle D, as shown and described.

LEVERETT EUGENE RHODES.

Witnesses:
R. C. ANDRUS,
AUGUSTUS SEQUEIRA.